United States Patent
Souchard

(10) Patent No.: US 8,116,586 B2
(45) Date of Patent: Feb. 14, 2012

(54) ESTIMATING AND REMOVING DISTORTION FROM AN IMAGE

(75) Inventor: Christophe Souchard, Marina del Rey, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/018,418

(22) Filed: Jan. 31, 2011

(65) Prior Publication Data

US 2011/0122149 A1 May 26, 2011

Related U.S. Application Data

(63) Continuation of application No. 11/261,094, filed on Oct. 29, 2005, now Pat. No. 7,912,317.

(51) Int. Cl.
*G06K 9/40* (2006.01)
(52) U.S. Cl. .......... 382/275; 345/647; 348/241
(58) Field of Classification Search .......... 382/100, 382/254, 255, 260–266, 274, 275; 345/427, 345/428, 581, 611, 619, 647, 650, 651, 652, 345/655, 661; 348/207.99, 208.4, 208.13, 348/241, 252, 333.12
See application file for complete search history.

(56) References Cited

U.S. PATENT DOCUMENTS

| | | | |
|---|---|---|---|
| 5,276,519 A * | 1/1994 | Richards et al. | 348/241 |
| 5,513,309 A | 4/1996 | Meier et al. | |
| 5,675,380 A | 10/1997 | Florent et al. | |
| 6,618,494 B1 | 9/2003 | Nonay et al. | |
| 6,816,625 B2 * | 11/2004 | Lewis et al. | 382/275 |
| 6,940,529 B2 | 9/2005 | Deering | |
| 6,974,373 B2 | 12/2005 | Kriesel | |
| 7,214,128 B2 | 5/2007 | Kriesel | |
| 7,359,572 B2 | 4/2008 | Liu et al. | |
| 7,619,663 B2 * | 11/2009 | Sakurai et al. | 348/241 |
| 7,912,317 B2 | 3/2011 | Souchard | |
| 2001/0014180 A1 | 8/2001 | Ejiri et al. | |
| 2002/0015052 A1 | 2/2002 | Deering | |
| 2002/0041383 A1 * | 4/2002 | Lewis et al. | 358/1.9 |
| 2003/0206179 A1 | 11/2003 | Deering | |
| 2004/0050931 A1 | 3/2004 | Ono et al. | |
| 2005/0257748 A1 | 11/2005 | Kriesel et al. | |
| 2006/0029291 A1 | 2/2006 | Sun et al. | |
| 2006/0050074 A1 * | 3/2006 | Bassi | 345/427 |
| 2006/0050087 A1 | 3/2006 | Tanimura et al. | |
| 2006/0098897 A1 | 5/2006 | Dewaele | |

(Continued)

OTHER PUBLICATIONS

Portions of prosecution history of U.S. Appl. No. 11/261,094, filed Feb. 10, 2011, Souchard, Christophe.

(Continued)

*Primary Examiner* — Anand Bhatnagar
(74) *Attorney, Agent, or Firm* — Adeli & Tollen LLP

(57) ABSTRACT

Some embodiments provide a method of editing images with distortion caused by a camera lens. The method identifies a set of geometries on a set of images taken by the camera lens. The method finds transformations for applying on the set of identified geometries to remove distortion on the geometries. The method applies the transformations to images taken by the camera lens to remove distortions. In some embodiments the identified geometries are curvilinear lines that correspond to straight lines in the scene being captured by the lens. Some embodiments provide a method of matching distortion for adding graphical objects to images. The method first removes the distortion on the images as described above. The method then adds the graphical objects to these images. Finally, the method applies inverse transformations on the images to restore them to their original form.

29 Claims, 17 Drawing Sheets

U.S. PATENT DOCUMENTS

| | | |
|---|---|---|
| 2006/0120583 A1 | 6/2006 | Dewaele |
| 2006/0188172 A1 | 8/2006 | Higurashi et al. |
| 2007/0025636 A1 | 2/2007 | Furukawa et al. |
| 2007/0091118 A1 | 4/2007 | Allen et al. |
| 2008/0101713 A1* | 5/2008 | Edgar .......................... 382/260 |

OTHER PUBLICATIONS

Thormählen, Thorsten, et al., "Robust Line-based Calibration of Lens Distortion from a Single View," Proceedings of Mirage, Mar. 10-12, 2003, pp. 105-112, INRIA, Rocquencourt, France.

* cited by examiner

ESTIMATING AND REMOVING DISTORTION FROM AN IMAGE

CLAIM OF BENEFIT TO PRIOR APPLICATIONS

This application is a continuation application of U.S. patent application 11/261,094, filed Oct. 29, 2005, now issued as U.S. Pat. No. 7,912,317. U.S. Pat. No. 7,912,317 is incorporated herein by reference.

FIELD OF THE INVENTION

The present invention relates to video processing and in particular to lens distortion removal.

BACKGROUND OF THE INVENTION

Wide angle and fish-eye lenses, as well as low-cost camera optics usually generate a lot of distortions in the image. Lens distortion occurs when the camera lens bends the light in some undesirable way. Two common types of lens distortion are barrel distortion and pincushion distortion. Typically, wide angle lenses tend to suffer from barrel distortion and telephoto lenses from pincushion distortion. FIG. 1 illustrates examples of these distortions. As shown in this figure, barrel distortion 110 makes ordinarily straight lines of a rectilinear object 105 to appear to bend outward from the center of the image. Pincushion distortion 115, on the other hand, makes the lines bend inward toward the center. The distortions may be caused, for example, by lens imperfections or may occur from the geometry of the lens.

Image distortions can be critical for many algorithms especially in the computer vision and three dimensional (3D) compositing fields. Therefore, it is desirable to remove the distortions. There are several algorithms for camera calibration. These algorithms, however, require the use of a calibration grid with feature points whose 3D world coordinates are known. There is, therefore, a need in the art for a technique to remove lens distortions without requiring calibration grid points.

SUMMARY OF THE INVENTION

Some embodiments provide a method of editing images with distortion caused by a camera lens. The method identifies a set of geometries on a set of images taken by the camera lens. The method finds transformations for applying on the set of identified geometries to remove distortion on the geometries. The method applies the transformations to images taken by the camera lens to remove distortions. In some embodiments the identified geometries are curvilinear lines that correspond to straight lines in the scene being captured by the lens.

Some embodiments provide a method of matching distortion for adding graphical objects to images. The method first removes the distortion on the images as described above. The method then adds the graphical objects to these images. Finally, the method applies inverse transformations on the images to restore them to their original form.

BRIEF DESCRIPTION OF THE DRAWINGS

The novel features of the invention are set forth in the appended claims. However, for purpose of explanation, several embodiments are set forth in the following figures.

DETAILED DESCRIPTION OF THE INVENTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments provide a method of editing images with distortion caused by a camera lens. The method identifies a set of geometries on a set of images taken by the camera lens. The method finds transformations for applying on the set of identified geometries to remove distortion on the geometries. The method applies the transformations to images taken by the camera lens to remove distortions. In some embodiments the identified geometries are curvilinear lines that correspond to straight lines in the scene being captured by the lens.

Some embodiments provide a method of matching distortion for adding graphical objects to images. The method first removes the distortion on the images as described above. The method then adds the graphical objects to these images. Finally, the method applies inverse transformations on the images to restore them to their original form.

I. Overview

Figure 1:
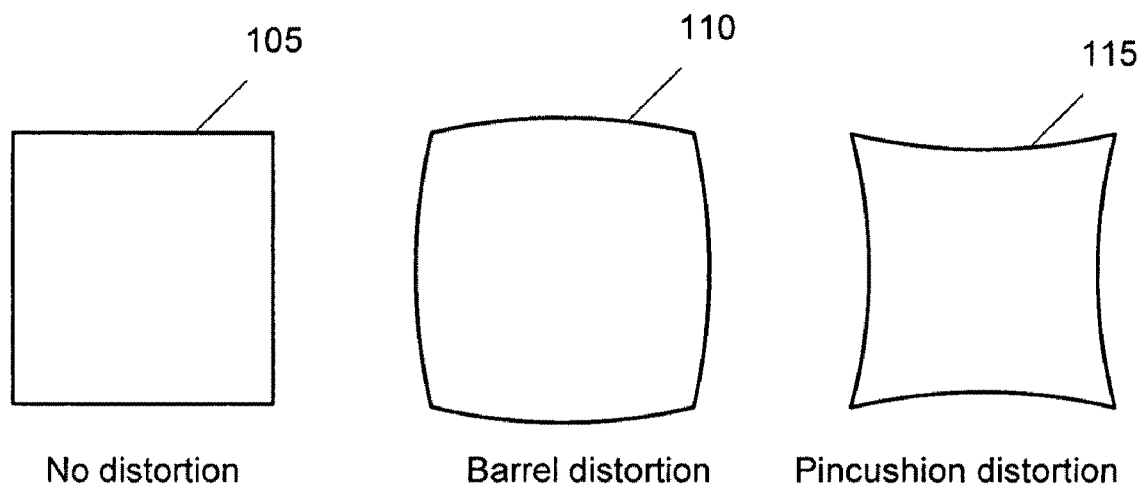
FIG. 1 illustrates different types of image distortion.
Figure 2:
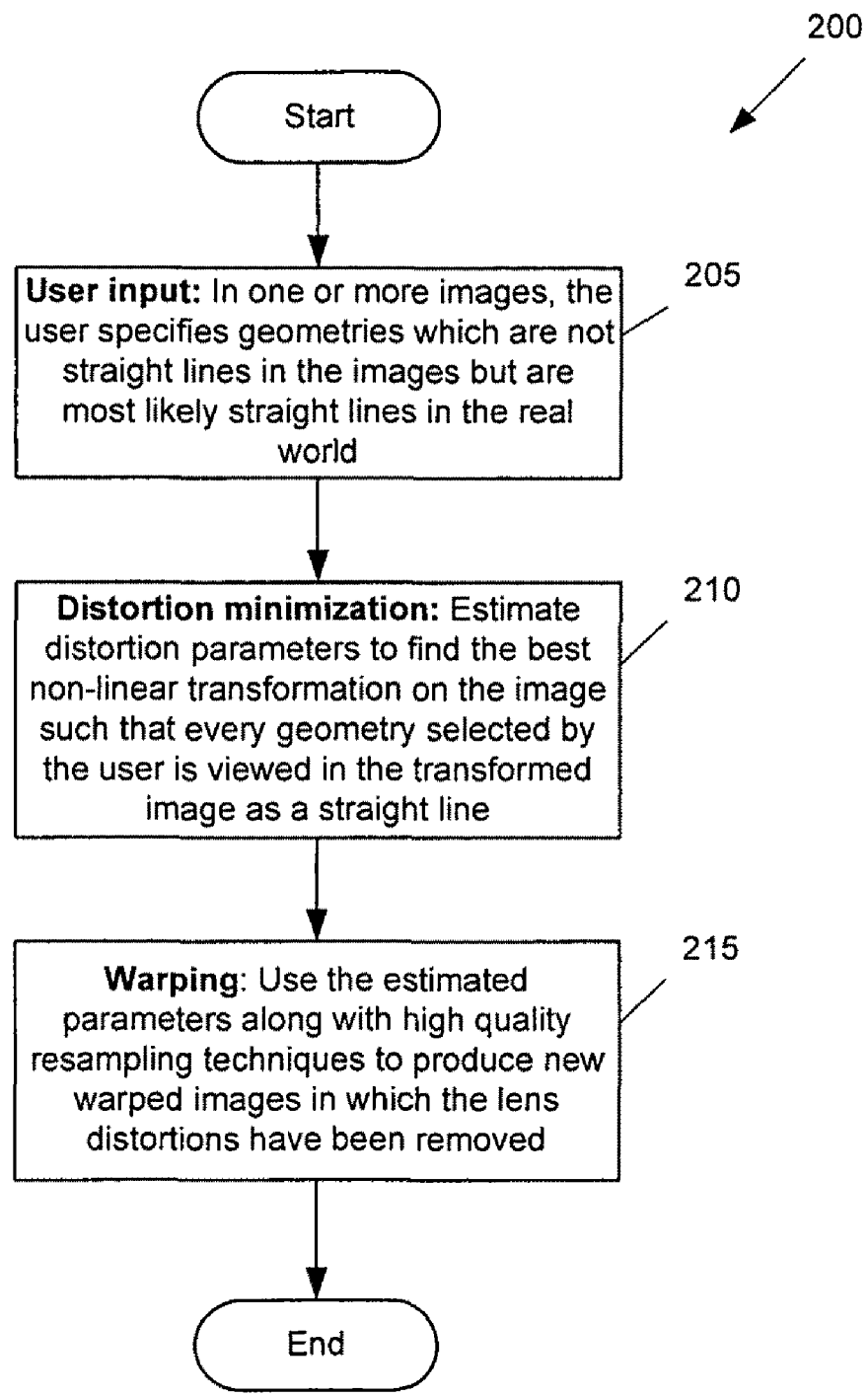
FIG. 2 illustrates a high level flowchart of the lens distortion process of some embodiments.

Prior art methods of removing the effects of lens distortion from an image require the use of a calibration grid with known three dimensional (3D) coordinates. One novel advantage of the embodiments described below is that these embodiments only require that the image seen through the camera must contain geometries that correspond to straight lines in real world. Assuming that, ideally, the projection of any line in space onto the camera space must be a straight line, some embodiments provide a process for estimating and removing lens distortion. FIG. 2 illustrates the overall distortion removal process 200 of some embodiments. This process entails three stages of user interface, distortion minimization, and warping.

More specifically, the process 200 initially (at 205) receives the user identification of geometries that must be straight. Next, during distortion minimization stage, the process 200 estimates (at 210) distortion parameters to find the best non-linear transformation on the image that causes the selected geometries to be viewed in the transformed image as straight lines. Finally, during warping stage 215, the estimated parameters are utilized in conjunction with a high quality resampling technique to produce new warped images in which the lens distortions have been removed. The details of each stage are given in sections below.

The Lens Model

Figure 3:
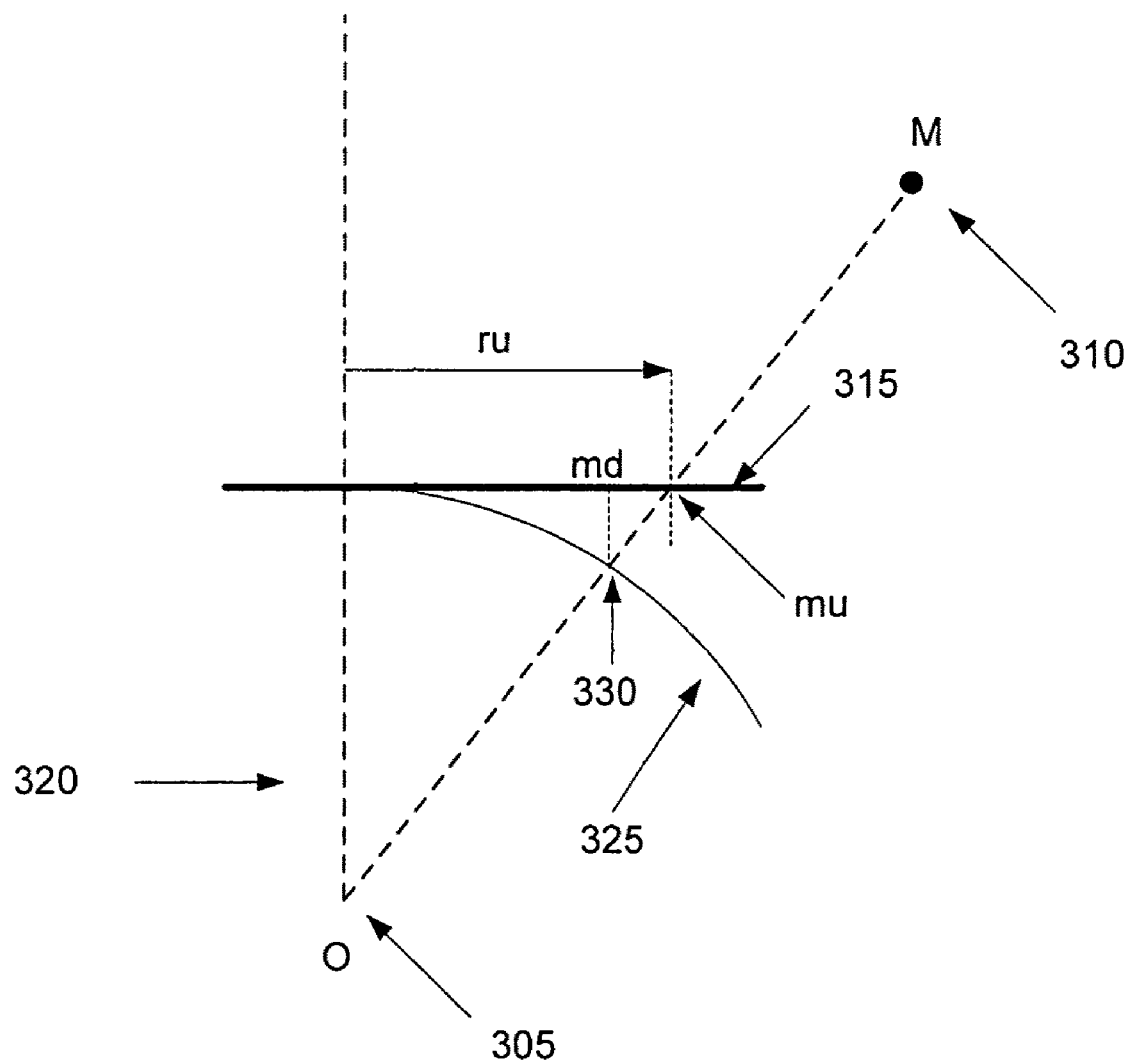
FIG. 3 illustrates a three dimensional to two dimensional perspective projection.

As further described below, the distortion minimization and warping stages are based on a particular model of the lens. This lens model decomposes the mapping between 3D points of the scene being captured and their corresponding 2D image points into a perspective projection and a function that models the deviations from the ideal perspective camera. FIG. 3 illustrates an example of such a perspective projection. The figure shows the optical axis 320, the optical center O, and a 3D point M. This point has coordinates X, Y, and Z in a camera-centered coordinate system. This point is projected to an "undistorted" image point mu on the image plane 315. The coordinates, xu and yu, of mu are expressed by the following equations (A) and (B):

$$xu = f*(X/Z) \qquad (A)$$

$$yu = f*(Y/Z), \qquad (B)$$

where f is the focal length associated with the projection.

Figure 4:
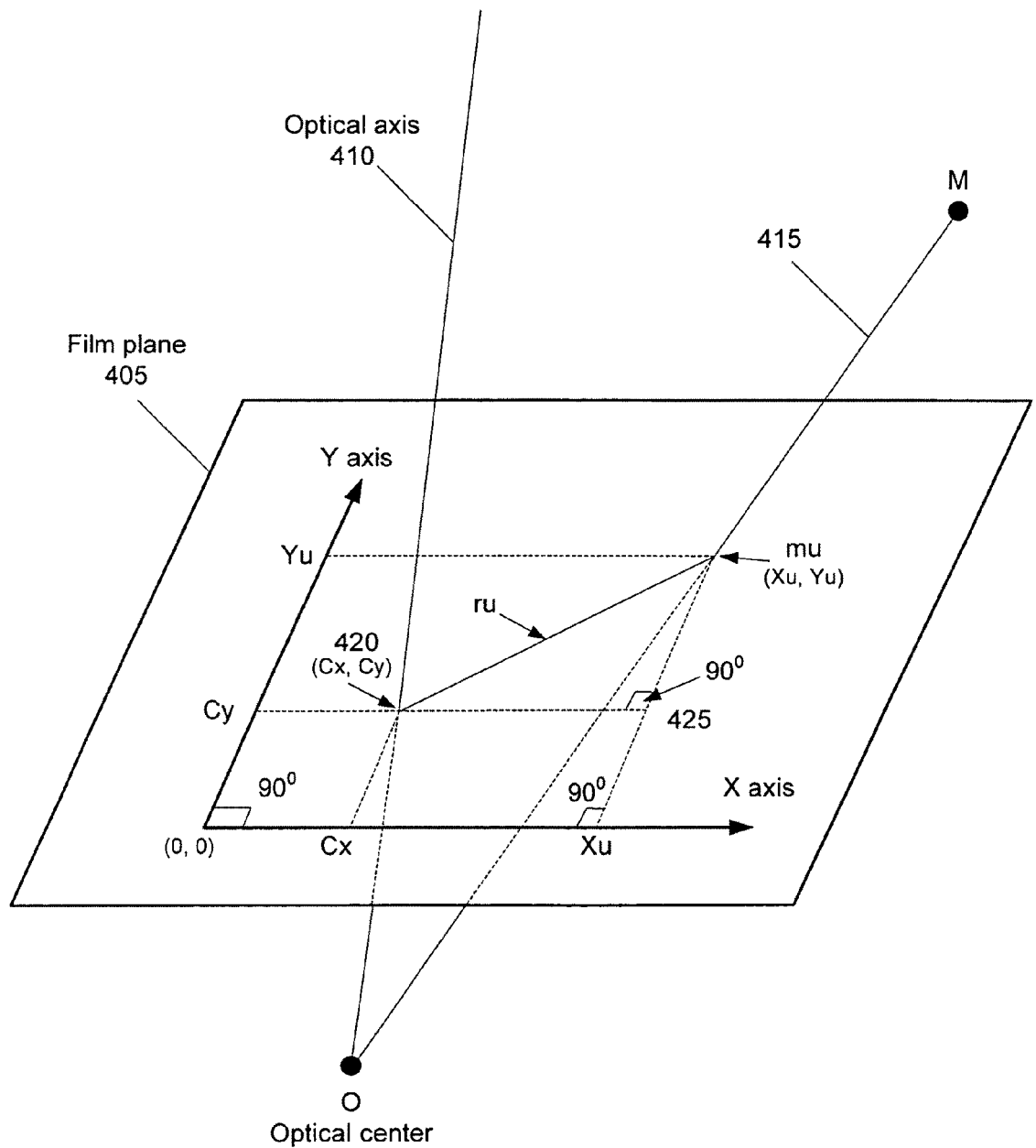
FIG. 4 is a three dimensional visualization of how parameter ru is derived.

Due to lens distortion, the image of a 3D point such as M is created at a point 330 on a surface such as 325. The projection of this point 330 on the film plane 315 will be at a distorted point such as md. The curved line 325 illustrates the effects of lens distortion on the images of 3D points. The points whose images are closer to the optical axis 320 have less distortion than the points farther from the optical axis 320. As indicated above, for M, the distorted image md is the projection of the intersection 330 of the curve 325 with the line between the optical center O and point M. The coordinates, xd and yd, of md are expressed by the following equations (C) and (D):

$$xd = Sx*xu*(Kd/ru) \qquad (C)$$

$$yd = Sy*yu*(Kd/ru), \qquad (D)$$

where $ru = \sqrt{((Cx-xu)^2 + (Cy-yu)^2)}$; Kd is the distortion function; Cx, and Cy are the coordinates of the optical center O; and Sx, and Sy are scaling factors. FIG. 4 shows how the value of ru is derived. The undistorted image of a 3D point M on the film plane 405 is the intersection mu of the film plane 405 with the imaginary line 415 from the optical center, O, to point M. As illustrate in FIG. 4, the intersection 420 of the optical axis 410 and the film plane 405 is not necessarily at coordinate (0, 0) and has coordinates of Cx and Cy. The distance, ru, is the side opposite to the right angle of a triangle formed from connecting mu, 420, and 425.

As shown in FIG. 3, the distance between any point, md, in the image and the principal point, mu, is proportional to the angle between the optical axis 320 and the line between the 3D point and the optical center, O, because of distortion. The corresponding distortion function Kd is as follows:

$$Kd = \arctan(ru*\sin(2*Theta)/(\cos(Theta)*(1+\cos(Theta)))/Theta, \qquad (E)$$

where Theta is a parameter that represents the distortion amount. As described in the following sections, the above lens model is utilized to estimate the parameters Theta, Cx, Cy, Sx, and Sy that minimize the lens distortion and hence the curvature of the 3D segments projected to the image. In these sections, several video editing embodiments are described as examples. A person of ordinary skill in the art, however, will realize that the same techniques can be applied to one or more images taken by a single shot (still) camera.

II. User Interface

As mentioned above by reference to FIG. 2, the distortion removal process 200 initially requires a user to identify geometries in one or more images that are not straight but need to be straight. In some embodiments, the user utilizes a tool (such as a spline tool) to specify the curvilinear lines in the image which the user believes correspond to straight lines of the scene being captured. For doing this, the user can rely on looking for familiar shapes in the image or the shapes that the user can determine that are most likely straight lines in real world. The tool allows the user to define one or more segments on a geometry (such as a curvilinear line) on the image that the user believes need to be straight. The curve on the image is, therefore, represented by a set of segments connected at endpoints.

Figure 5:
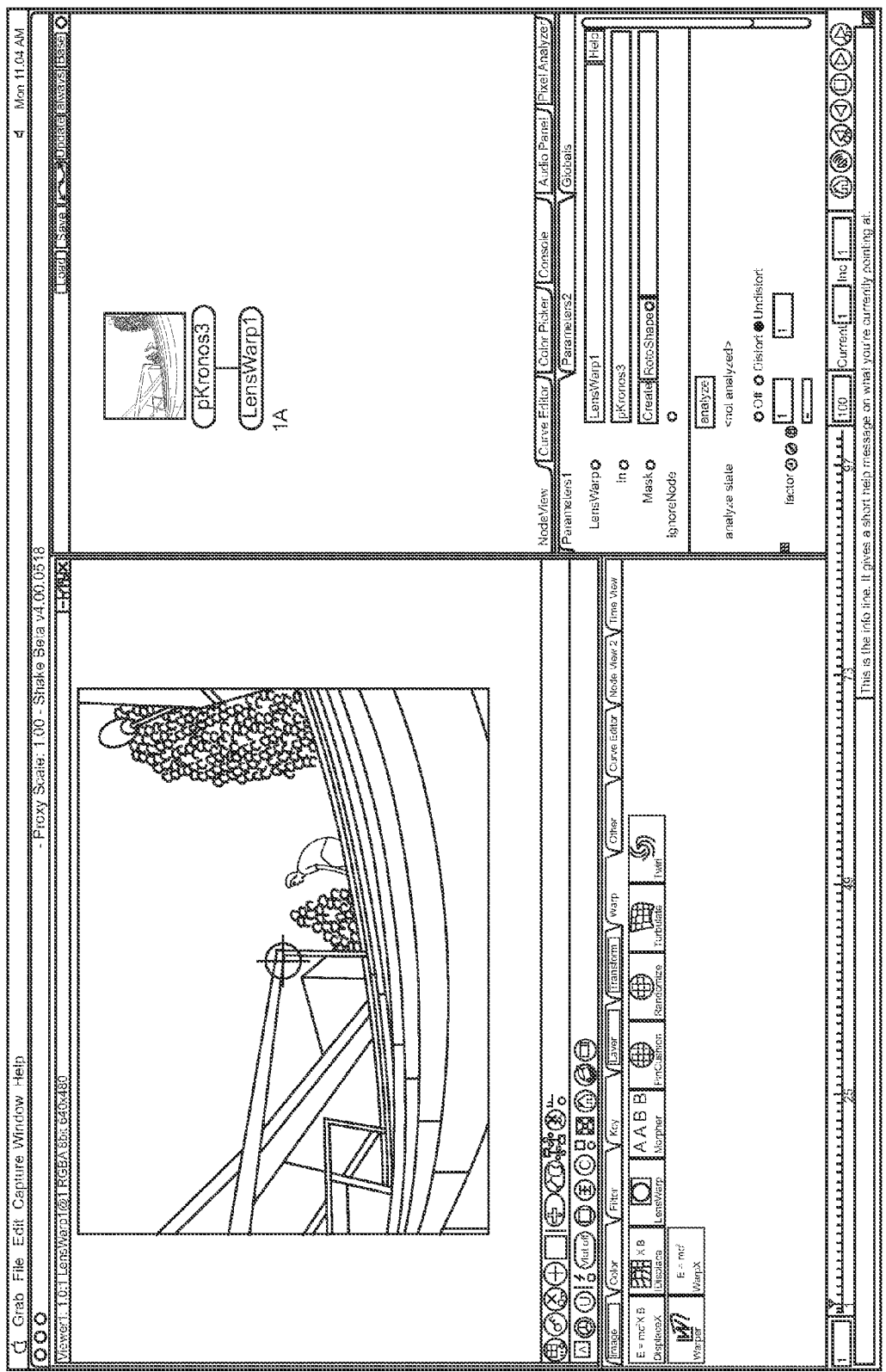
FIG. 5 illustrates an example of an image that is distorted by the lens in a video compositing embodiment.
Figure 6:
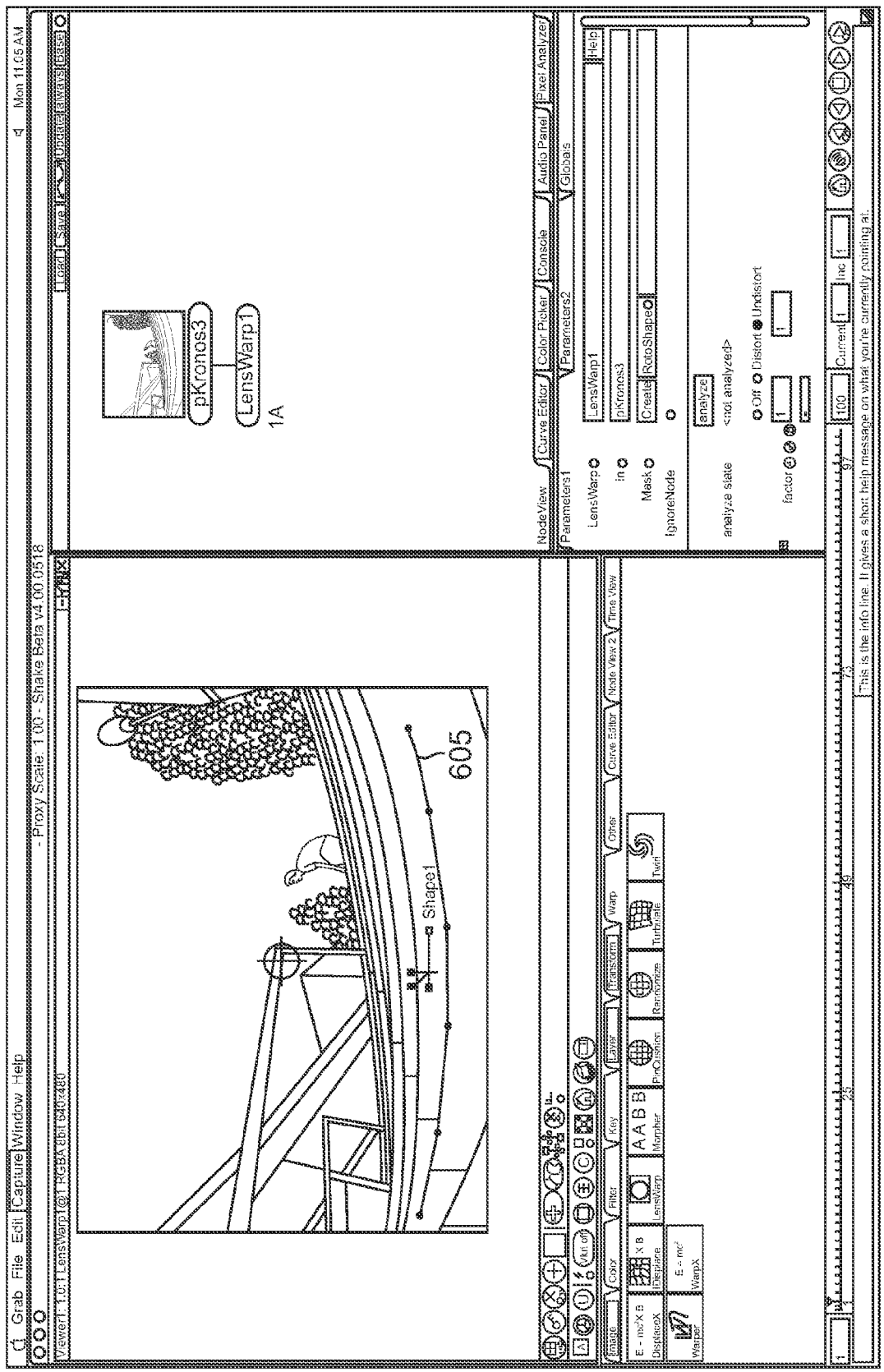
FIG. 6 illustrates the image of FIG. 5 after the user has identified a geometry corresponding to a straight line in the scene being captured.

FIG. 5 illustrates an example of an image that is distorted by the lens. FIG. 6 illustrates the same image after the user has determined that the curved lines at the bottom of the image need to be straight. The user has used the spline tool to identify several segments on one of the curvilinear lines 605. As shown in FIG. 6, the user has identified the curvilinear line 605 by selecting a set of points. In FIG. 6, these points are depicted as a set of circles on the curvilinear line 605. The user can fine tune the selection by adding, deleting, or moving the points. As the points are identified on the curvilinear line, the tool connects the lines to identify the curvilinear line by a set of connected segments. The process described in the following sections will transform the image in such a way that in the new transformed image, the identified curved line would appear as a straight line.

Figure 7:
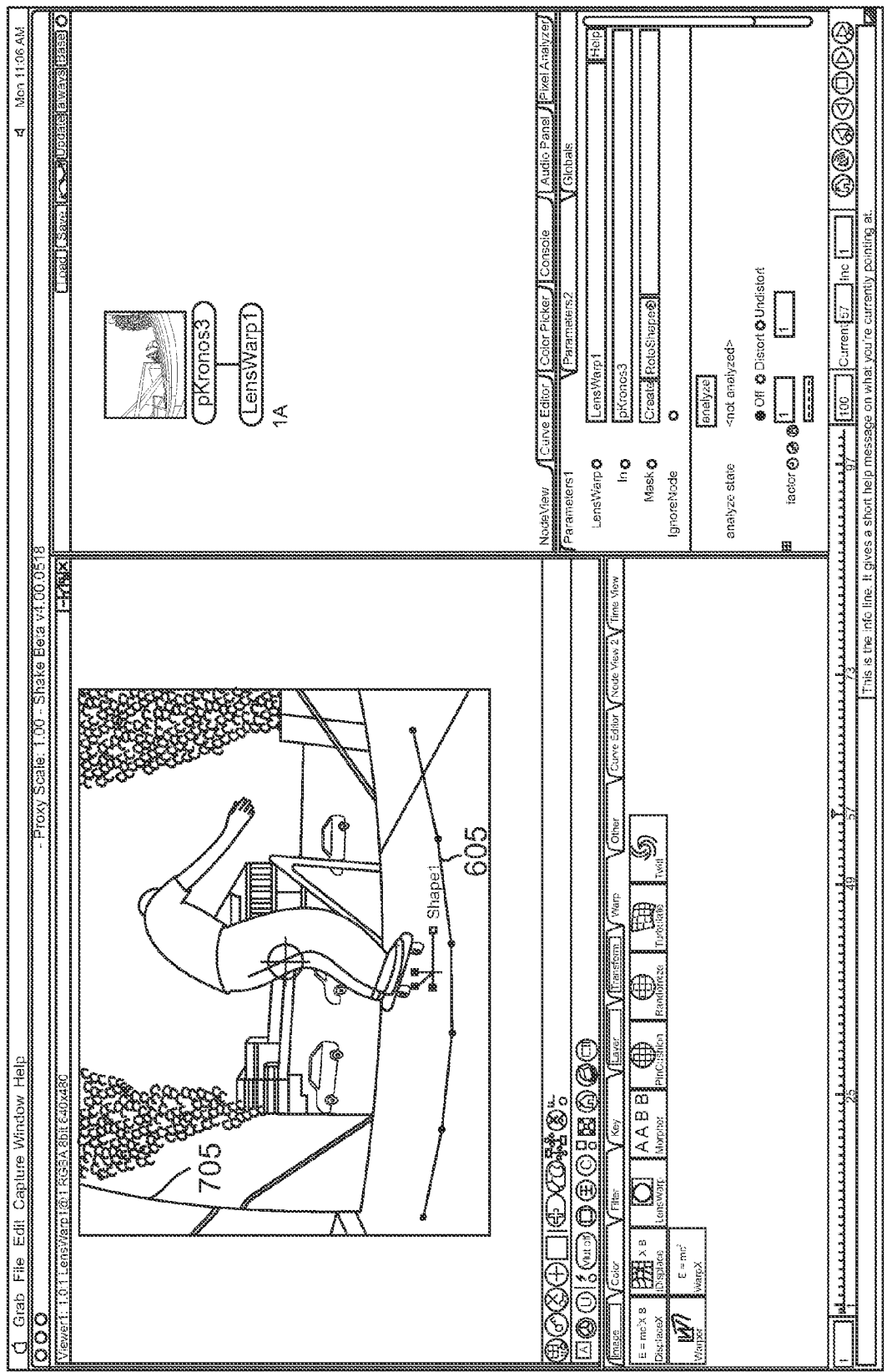
FIG. 7 is an example of a second distorted image being used in the process of removing lens distortion.
Figure 8:
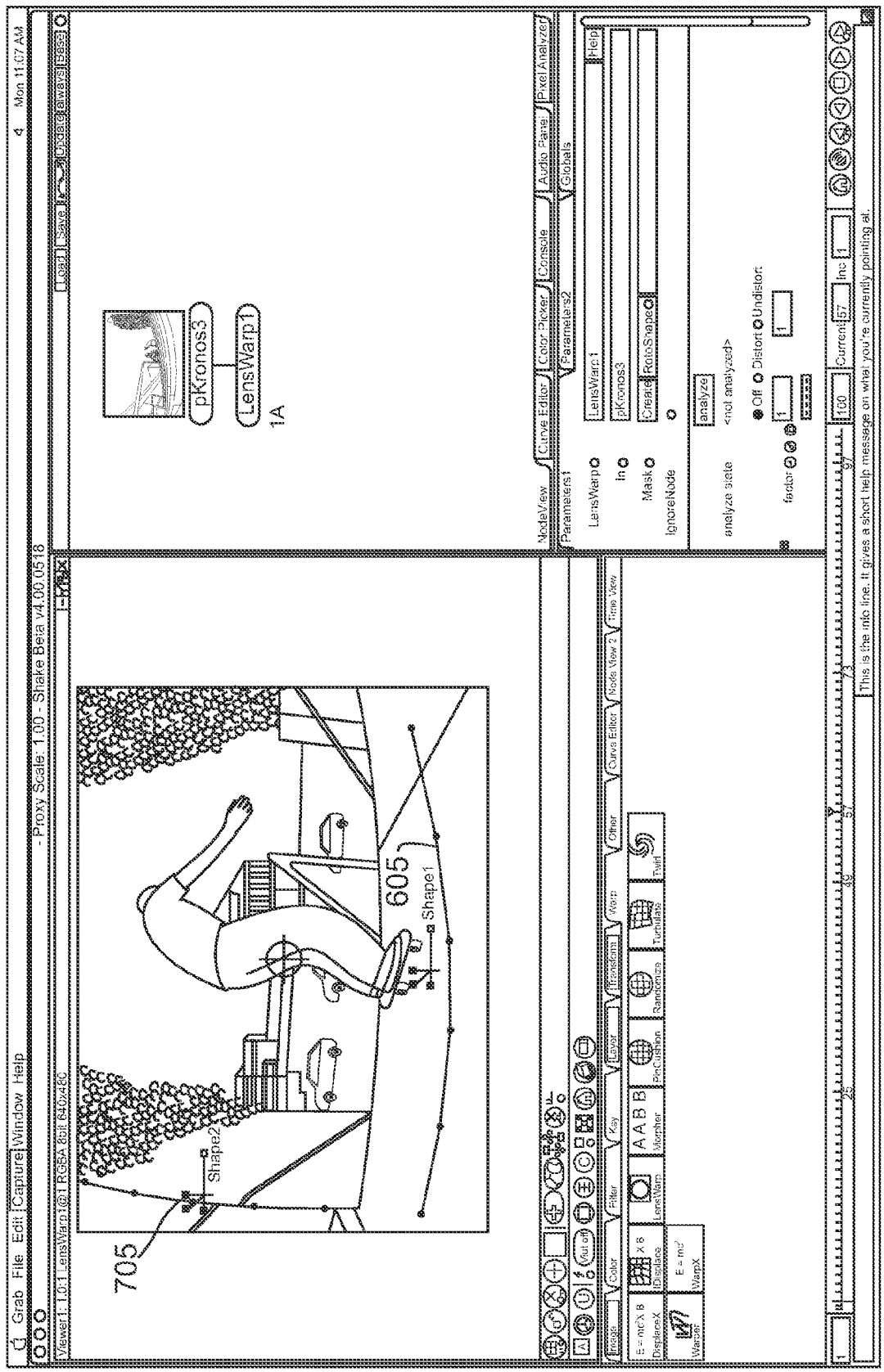
FIG. 8 illustrates the image of FIG. 7 after the user has identified a geometry on it that should be straight.

In some embodiments, the user can utilize the spline tool to identify several curvilinear lines either on the same image or on several different images. For instance, the user who identified the curvilinear line 605 on the image of FIG. 6 may go to a different image such as the image illustrated in FIG. 7 to identify another curvilinear line. As can be seen, the system keeps track of the previous set of points on the first curvilinear line 605 that was identified in FIG. 6. In FIG. 7, as an example, the user may determine that the vertical curved line 705 corresponds to a straight line in the captured scene. As illustrated in FIG. 8, the user has subsequently identified this second curvilinear line using the spline tool.

III. Distortion Minimization

A. Measurement of Distortion

As described in FIG. 2 above, after receiving the user input, the distortion removal process 200 performs a distortion minimization step 210. In order to estimate the distortion parameters, Theta, Cx, Cy, Sx, and Sy, some embodiments measure how much each identified curvilinear line is distorted. These embodiments utilize a distance function on the segments identified on a curvilinear line. The distance function will be zero if the curvilinear line is a perfect straight line. The more a curvilinear line is distorted, the bigger the distance is.

Some embodiments measure distortion by performing a least-squares approximation of each segment identified on a curvilinear line and take for the distortion the sum of squares of the distances from the end points of each segment to an approximated line. The least-squares is a mathematical optimization technique that attempts to find a best fit to a set of data by attempting to minimize the sum of the squares of the differences between the fitted function and the data. Some embodiments use the following equation (F) for the error in the least-squares approximation. The curvilinear line is identified by a set of N points and each point, i, has coordinates $x_i$ and $y_i$.

$$E = a*\sin(\psi) - 2*|b|*|\sin(\psi)|*\cos(\psi) + c*(\cos(\psi))^2 \quad (F)$$

where:

$$a = \sum_N^{i=1} x_i^2 - \frac{\left(\sum_N^{i=1} x_i\right)^2}{N} \quad (G)$$

$$b = \sum_N^{i=1} x_i y_i - \frac{\left(\sum_n^{i=1} x_i\right)*\left(\sum_N^{i=1} y_i\right)}{N} \quad (H)$$

$$c = \sum_N^{i=1} y_i^2 - \frac{\left(\sum_n^{i=1} y_i\right)^2}{N} \quad (I)$$

$$\sin(\psi) = \sqrt{(0.5 - \alpha)} \quad (J)$$

$$\cos(\psi) = \sqrt{(0.5 + \alpha)} \quad (K)$$

$$\alpha = \frac{a - c}{2*\sqrt{(a-c)^2 + 4*b^2}} \quad (L)$$

B. Minimizing the Error Measurement

This distortion measurement is then minimized using a non-linear method to find the best distortion parameters. Some embodiments utilize the well-known Levenberg-Marquardt method. Other methods such as Gauss-Newton, gradient descent or any other method of finding the minimum of a function expressed as a sum of squares of nonlinear functions may be used. Like other numeric minimization algorithms, the Levenberg-Marquardt algorithm is an iterative procedure. To start minimization, the user has to provide an initial guess for the parameters being optimized. In each step of the iteration, the parameters values are replaced by new estimates. The iterative process continues until either a maximum number of steps are taken or until the error is less than a predetermined threshold.

C. Parameter Estimation

Figure 9A:
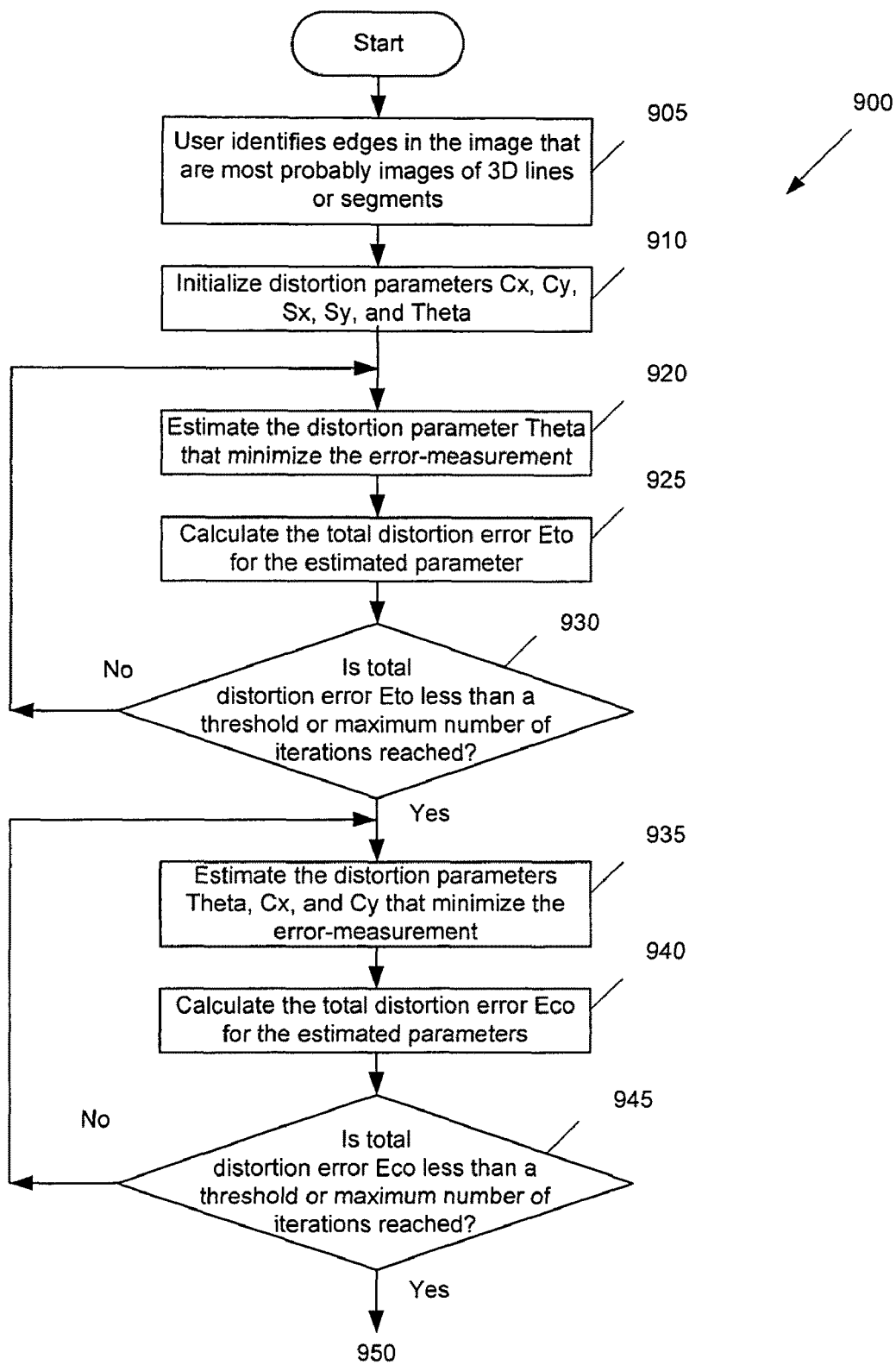
FIG. 9 illustrates a detailed flowchart of the lens distortion process of some embodiments.
Figure 9B:
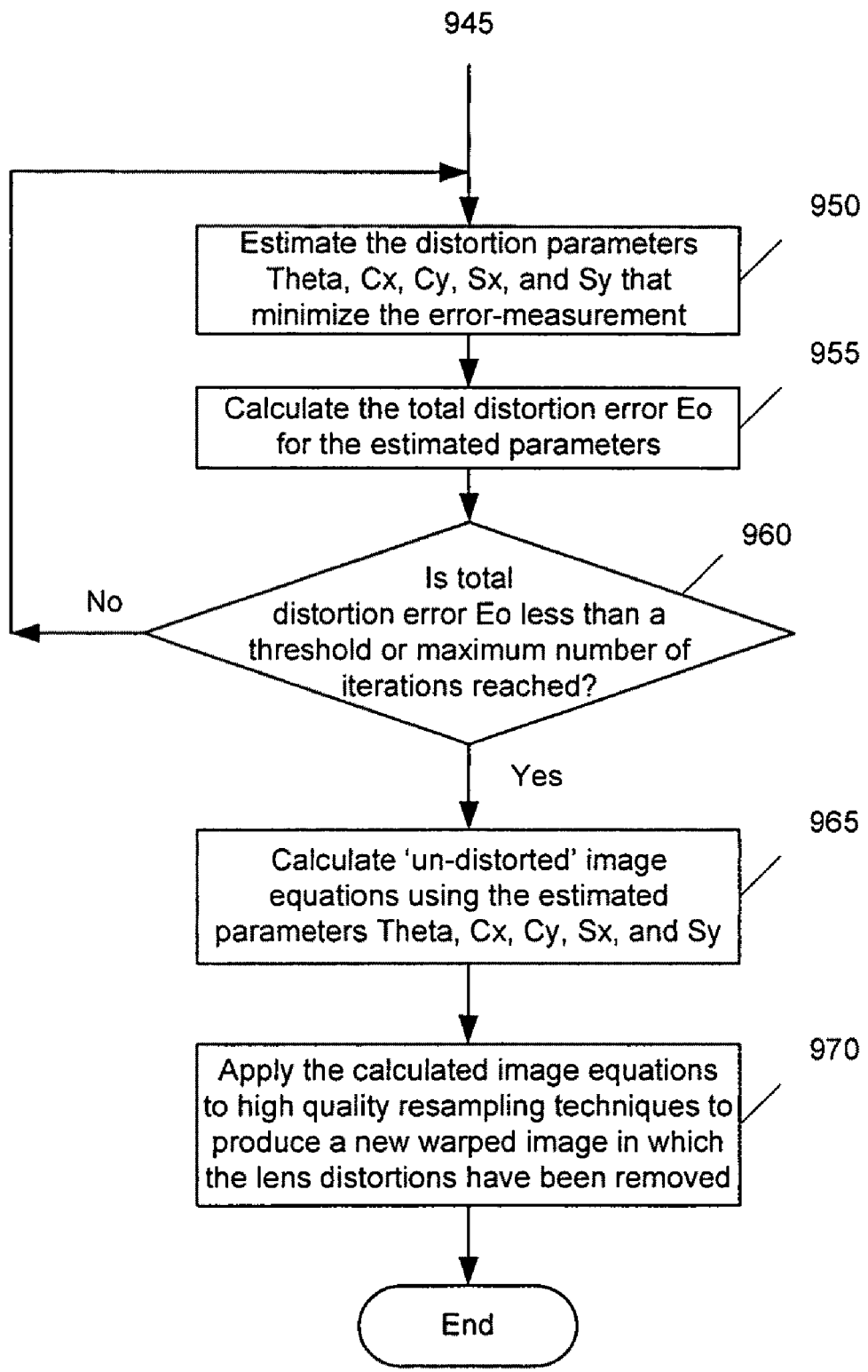

Some embodiments perform lens distortion estimation and optimization in several steps. These embodiments first perform estimation and optimization on some of the parameters, e.g., Theta. Next, they include another set of parameters, e.g., Cx and Cy and perform distortion estimation and optimization on Theta, Cx, and Cy. Finally they include the rest of parameters, in this case, Sx and Sy and perform full optimization. FIG. 9 illustrates a process 900 that some embodiments utilize for estimating and removing lens distortions. Step 905 is the user interface stage described in Section II above and illustrated in FIG. 9 for completeness. In this step, as described above, the user uses a graphical user interface tool to identify segments that most likely correspond to straight lines in the captured scene.

Next at 910, the process initializes distortion parameters Theta, Cx, Cy, Sx, and Sy to reasonable initial values. For instance, some embodiments initialize Theta to 0; Cx and Cy to coordinates of the center of the image; and Sx and Sy to 1. Other initial values, e.g. values derived based on past experiments or chosen arbitrarily may also be used.

Next, in steps 920 to 930, the process uses a non-linear method (such as Levenberg-Marquardt described in Section III.B above) to find the best value for parameter Theta to minimize total distortion error. Specifically, at 920, the process estimates a new value for parameter Theta. Using this new value, the process calculates (at 925) the total distortion error Eto. Next at 930, the process compares the total error Eto with a threshold and also checks whether a maximum number of iterations is reached. If the value is larger than the threshold and the maximum number of iterations is not reached, the process returns back to step 920 to make another estimate for Theta. Otherwise, the process will proceed to step 935.

Next, in steps 935 to 945, the process includes two more parameters (Cx and Cy) in the estimation process and uses the least-squares method to find the best values for parameters Theta, Cx, and Cy to minimize distortion. Specifically, at step 935, the process estimates the distortion parameters Theta, Cx, and Cy. Next, at 940, the process calculates the total distortion error Eco based on the new values of the estimated parameters. As described in Section II above, some embodiments use more than one curvilinear line to estimate the parameters. These lines may all be identified by the user in the same image or alternately in several images. For instance, in the example described in Section II above, the user identified the curvilinear line 605 in the image shown in FIG. 6 and identified the curvilinear line 705 in the image shown in FIG. 8. The process may use the first identified set of segments to estimate some parameters, e.g., Theta and then use both sets of segments to estimate Theta, Cx, and Cy.

At 945, the process compares the calculated distortion error Eco with a threshold value and also checks whether a maximum number of iterations is reached. If the error Eco is larger than the threshold value and the maximum number of iterations is not reached, the process returns back to step 935 to estimate a new set of values for the modified parameters. Otherwise, the process proceeds to step 950.

Next, in steps 950 to 960, the process includes two more parameter (Sx and Sy) in the estimation process and uses the least-squares method to find the best value for parameters Theta, Cx, Cy, Sx, and Sy. Specifically, at 950, the process estimates new values for Theta, Cx, Cy, Sx, and Sy. Next at 955, the estimated values of the parameters are utilized to calculate the total distortion error Eo. Similar to step 945 above, some embodiments may utilize more than one curvilinear line, e.g., two, three or four lines to calculate the distortion error Eo. Next at 960, the total distortion error, Eo, is compared to a threshold value and also checks whether a maximum number of iterations is reached. If the error is larger than the threshold value and the maximum number of iterations is not reached, the process returns back to 950 to estimate new values for the parameters. Otherwise, the process proceeds to 965 to utilize the estimated values of the parameters to remove image distortion.

IV. Image Warping

At 965, the process utilizes the estimated values of the parameters Theta, Cx, Cy, Sx, and Sy to remove the lens distortion. Referring to FIG. 3, the process utilizes the values of these parameters to transform the distorted image and of a point M to an undistorted image mu. The coordinates, xu and yu, of an undistorted image point mu are expressed by following equations (M) and (N):

$$xu = xd/Sx * (Ku/rd) \quad (M)$$

$$yu = yd/Sy * (Ku/rd), \quad (N)$$

where rd=sqrt $((Cx-xd)^2+(Cy-yd)^2)$ and Ku which is the inverse of the distortion function, Kd, is equal to 0.5*tan(Theta*rd)*(1+cos(Theta))/sin(Theta).

Figure 10:
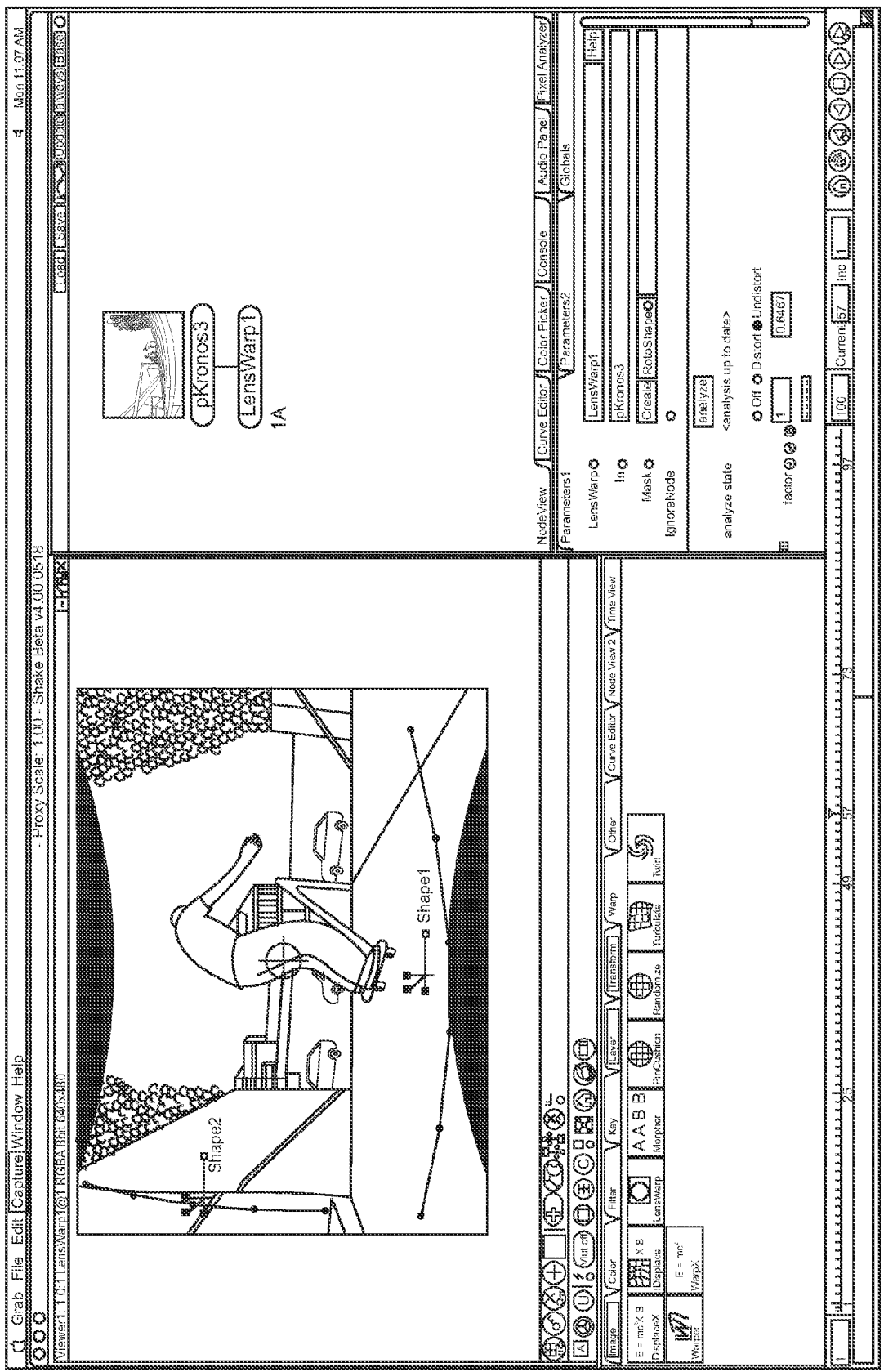
FIG. 10 illustrates the image of FIG. 7 after the lens distortion is removed.

Next at 970, applying these equations with the parameters estimated in step 950, the process uses high quality resampling techniques to produce a new warped image in which the lens distortions have been removed. FIG. 10 illustrates an example of the application of the above mentioned lens distortion removal technique to the distorted image shown in FIG. 8. As shown in FIG. 10, the identified line on the left of the image has been substantially straightened up after the lens distortion removal technique is applied.

IV. Applications of Lens Distortion Removal

Lens distortion estimation and removal process described in above sections may be applied to single images or may be used for video compositing and video editing applications across many video frames. As indicated above, the only requirement for the presented process is that the user has to identify geometries corresponding to real world straight lines in one or several images. The identified geometries may, therefore, be separated from each other both in space and in time.

Figure 11:
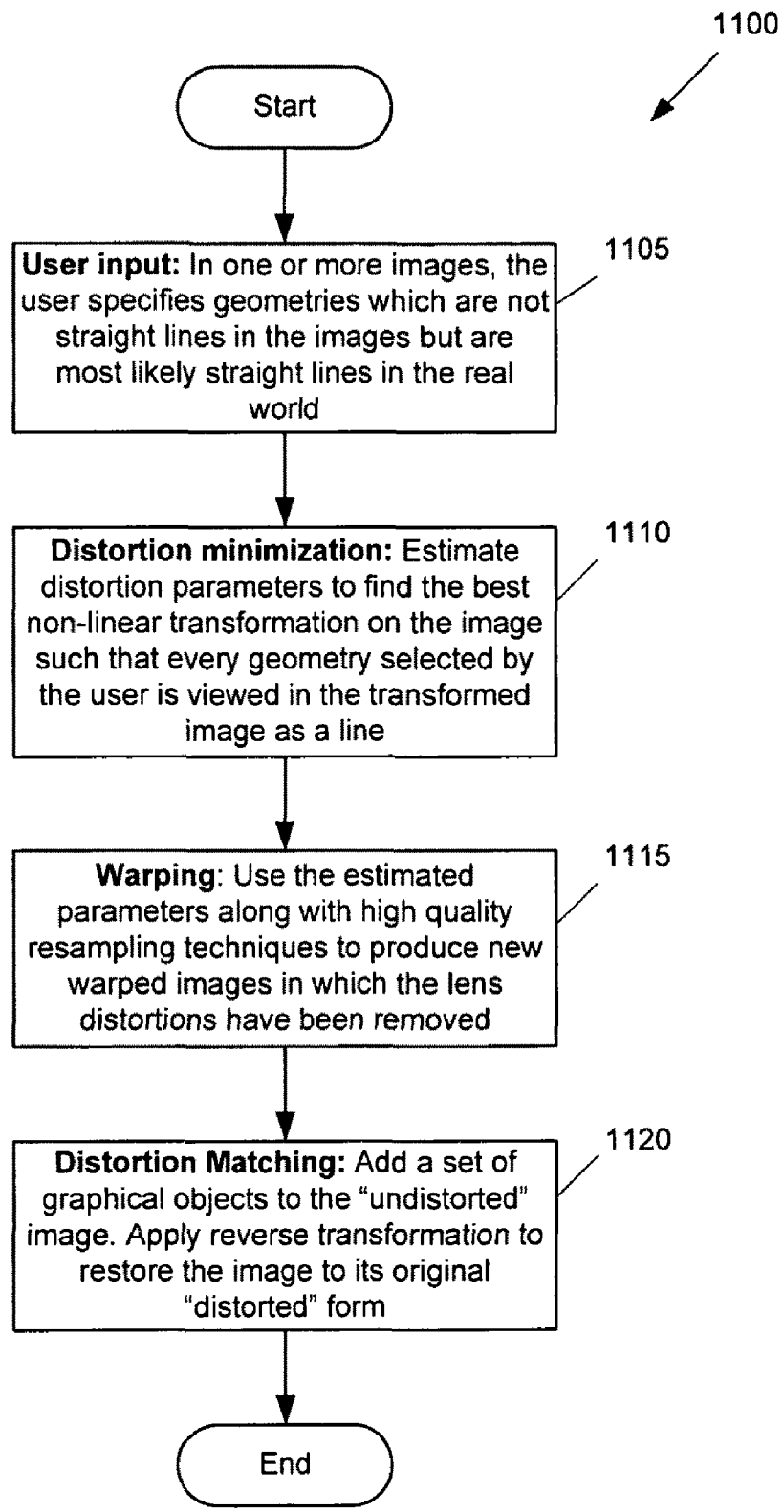
FIG. 11 illustrates a distortion matching process of some embodiments.

The process may be utilized to remove distortion as shown in FIG. 10, or may be used to match distortion. FIG. 11 illustrates a distortion matching process 1100. As shown in this figure, similar to the distortion removal process 200 indicated above, the distortion matching process 1100 has a user input stage 1105, a distortion minimization stage 1110, and a warping stage 1115. In addition, process 1100 has a distortion matching stage 1120. During this stage, a set of one or more graphical object is added (or superimposed) on the transformed, i.e. undistorted image. The graphical object may be text, another image, an icon, etc. After the graphical object is added to the image, the image is restored to its original "distorted" form by applying a reverse transformation.

Figure 12:
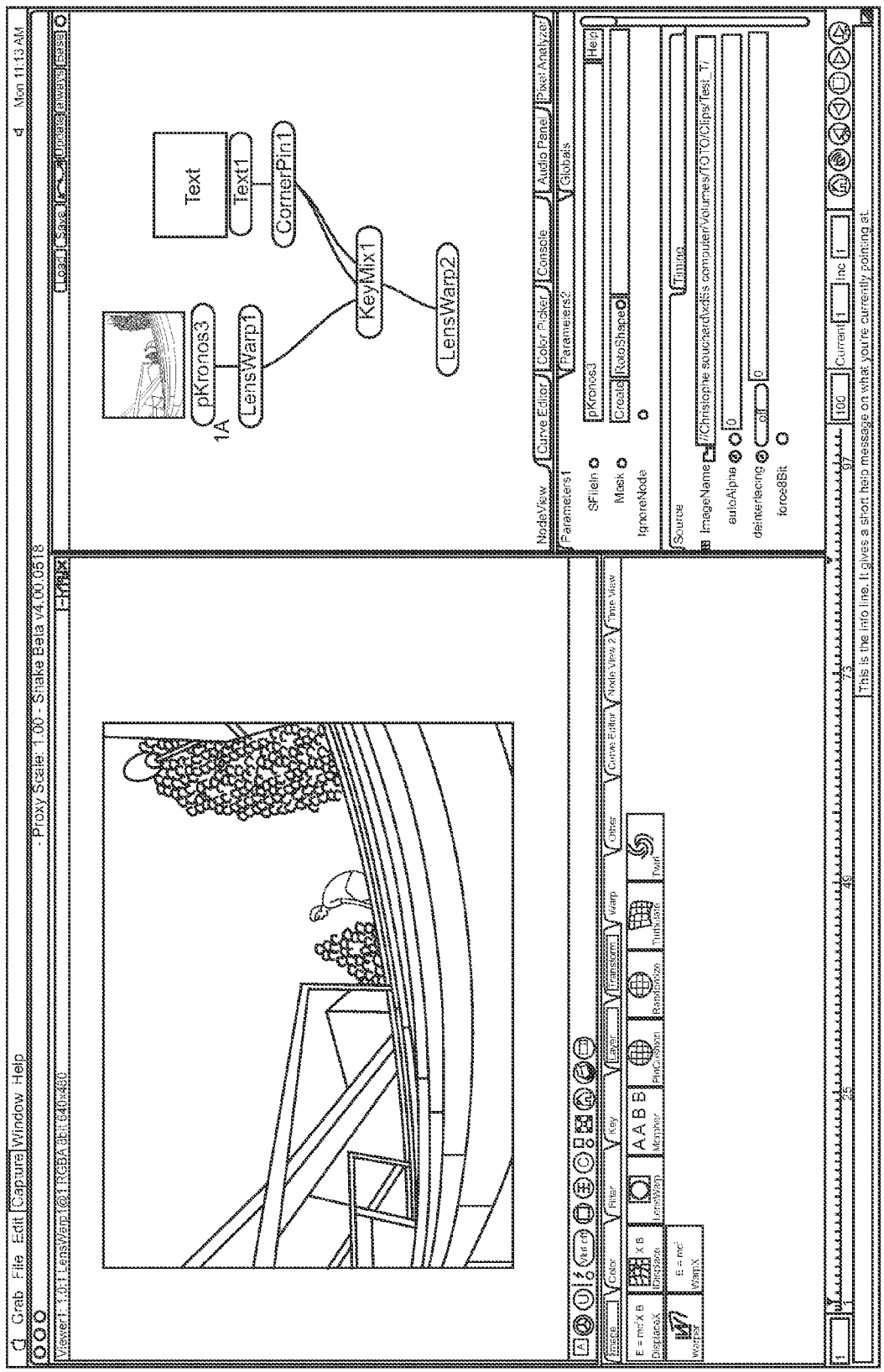
FIG. 12 illustrates a distorted image on which a graphical object is to be superimposed in some embodiments.
Figure 13:
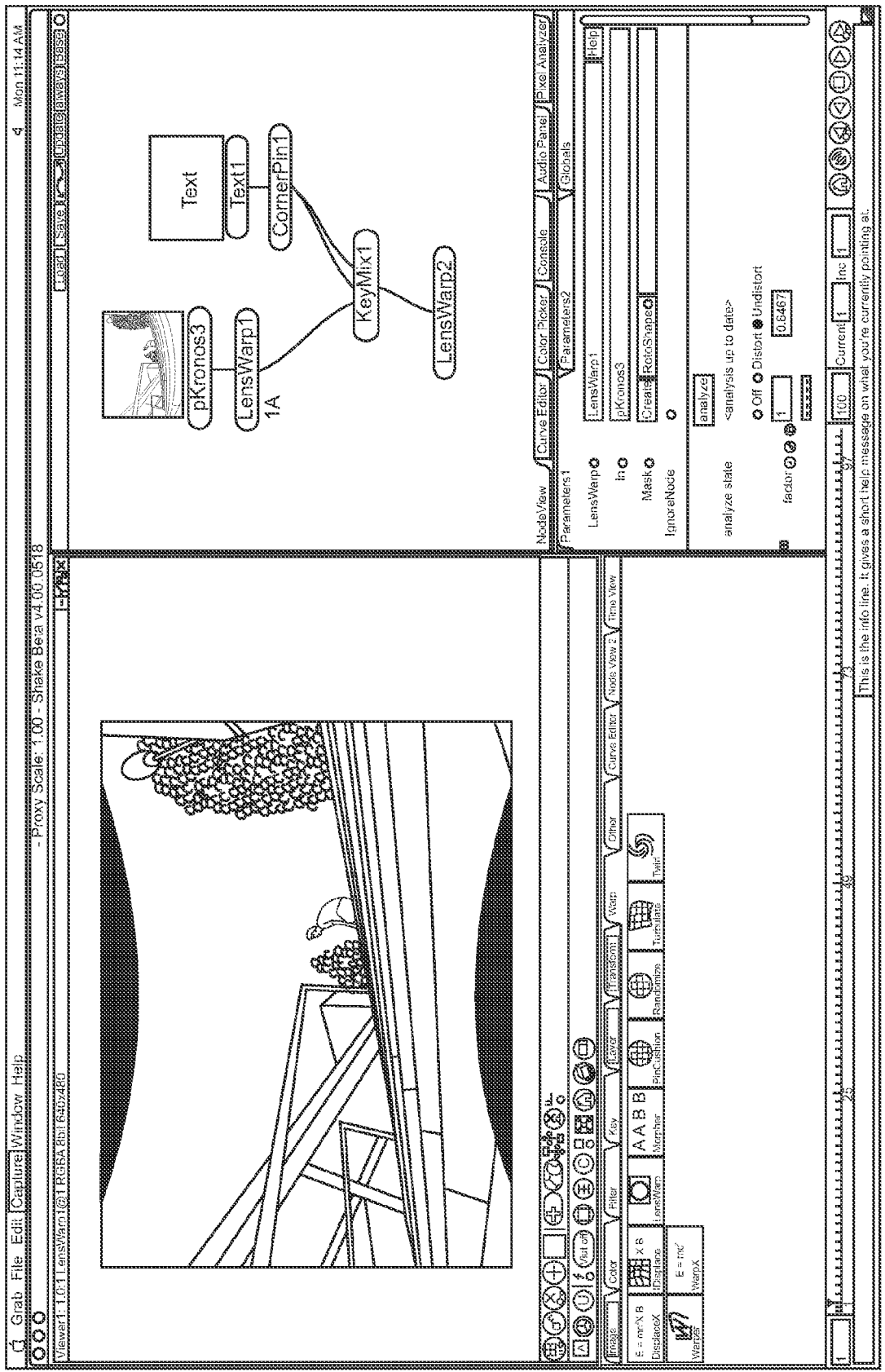
FIG. 13 illustrates the image of FIG. 12 after the lens distortion has been removed.
Figure 14:
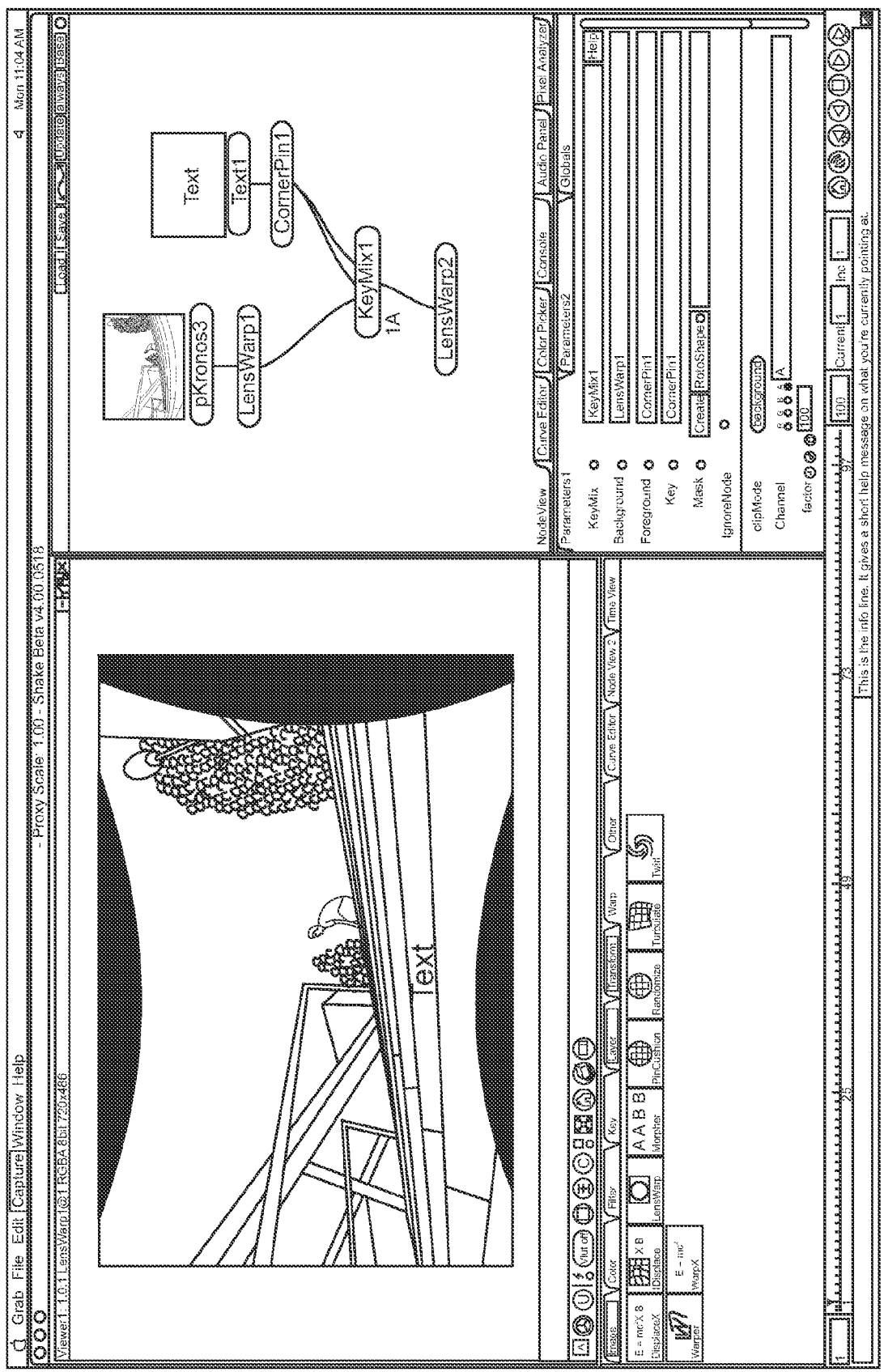
FIG. 14 is the image of FIG. 13 after the word "TEXT" has been added to it.
Figure 15:
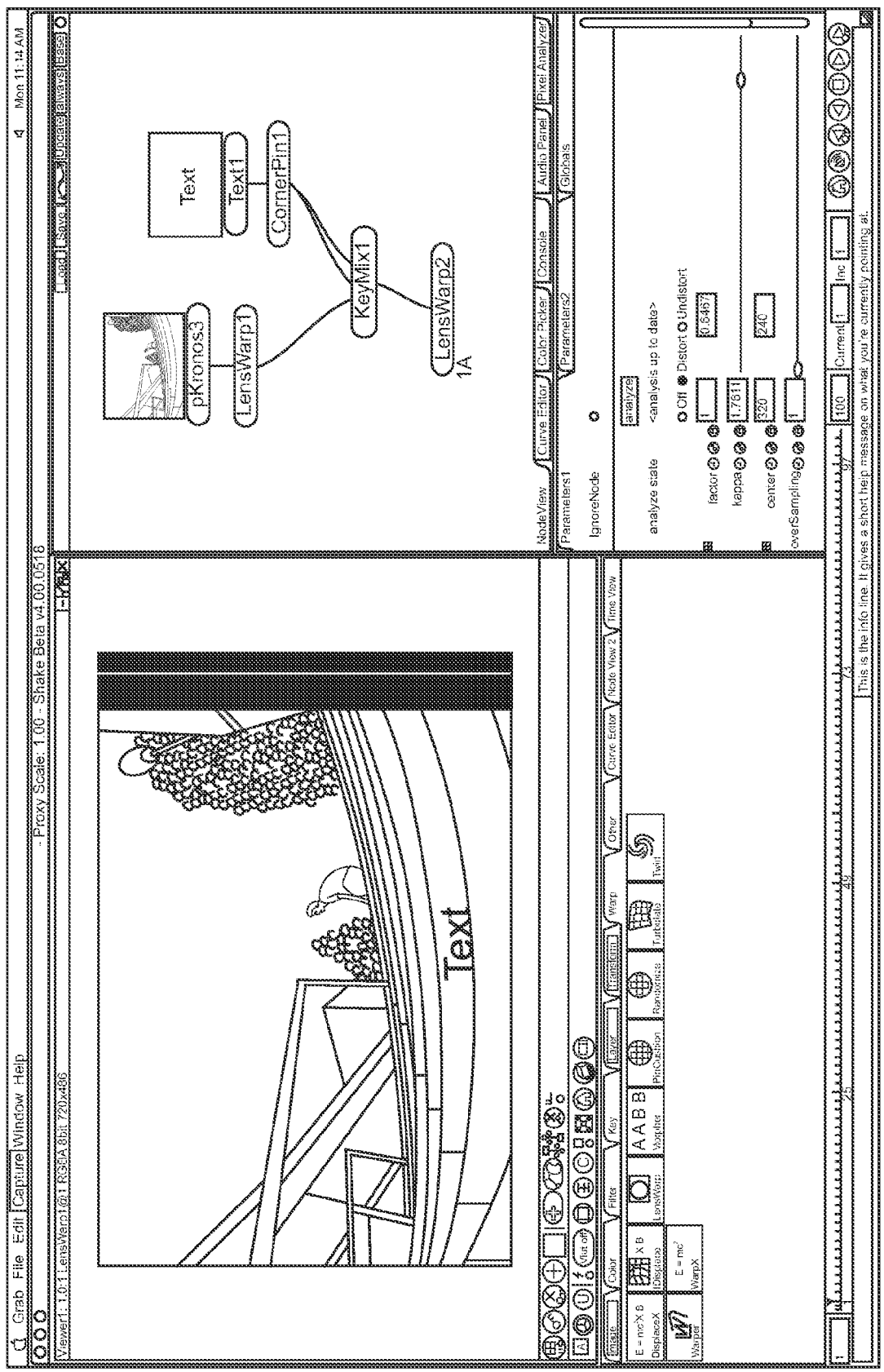
FIG. 15 illustrates the image of FIG. 14 after it is restored to its original "distorted" form.

An example of distortion matching process is illustrated by referencing FIGS. 12, 13, 14, and 15. Specifically, FIG. 12 illustrates a distorted image. FIG. 13 illustrates the same image after lens distortion removal process is applied to remove the distortions. FIG. 14 illustrates the words "TEXT" added to this "undistorted" image. Next, as illustrated in FIG. 15, the image is restored to its original "distorted" form with the words "TEXT" also following the contour of the distorted lines. The process is, thereby, utilized to add text or other objects superimposed on a distorted image.

One application of the lens distortion estimation and removal process is in compositing multimedia items. Some embodiments provide a graphical user interface (GUI) to perform compositing functions such as lens distortion estimation and removal; text and graphics objects superimposition; spline tool; etc. In some embodiments, multimedia items are composited by multimedia applications that represent the compositing process using a process (also referred to as composite) tree. In these embodiments, the process tree represents various multimedia items, transforms performed on the multimedia items, and the relationships between the items and transforms. The process tree offers an intuitive, nonlinear process that makes building and modifying complex composites fast and easy. Each item in the process tree is represented by a node. For instance, during video compositing, each particular node in this tree represents a particular stage in the video compositing process (i.e., represents a particular editing operation in the video compositing process).

In some embodiments, the nodes are selectable items in a graphical user interface. For instance, in some of these embodiments, a user can select a particular image and initiate a lens warp operation. As an example, FIGS. 12, 13, 14, and 15 described above illustrate a composite tree. In FIG. 12, the user has selected an image from the file "pKronos3". In FIG. 13, the user has applied "Lens Warp" operation on the image. In FIG. 14, the user has composed the word "TEXT" and mixed the text and the image. Finally, in FIG. 15, the user has performed a second "Lens Warp" operation on the image to restore the image to its original form. The above examples were described using several video compositing and editing embodiments of the invention. A person of ordinary skill would realize, however, that the lens distortion estimation and removal process described above is not limited to video compositing and editing applications but can be applied to any other image editing or multimedia applications.

Figure 16:
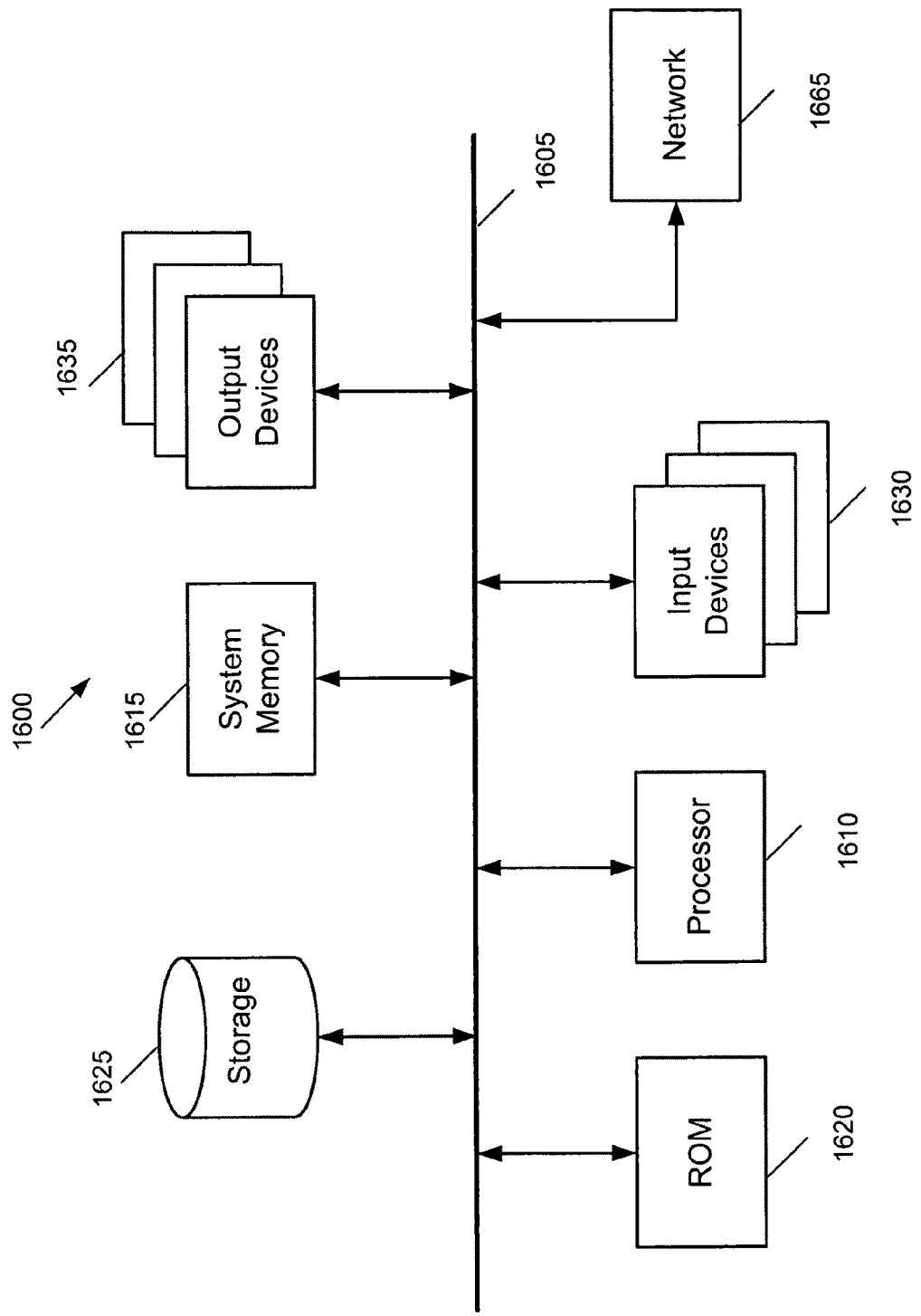
FIG. 16 conceptually illustrates a computer system with which some embodiments are implemented.

FIG. 16 conceptually illustrates a computer system with which some embodiments of the invention are implemented. The computer system 1600 includes a bus 1605, a processor 1610, a system memory 1615, a read-only memory 1620, a permanent storage device 1625, input devices 1630, and output devices 1635.

The bus 1605 collectively represents all system, peripheral, and chipset buses that support communication among internal devices of the computer system 1600. For instance, the bus 1605 communicatively connects the processor 1610 with the read-only memory 1620, the system memory 1615, and the permanent storage device 1625.

From these various memory units, the processor 1610 retrieves instructions to execute and data to process in order to execute the processes of the invention. The read-only-memory (ROM) 1620 stores static data and instructions that are needed by the processor 1610 and other modules of the computer system. The permanent storage device 1625, on the other hand, is a read-and-write memory device. This device is a non-volatile memory unit that stores instruction and data even when the computer system 1600 is off. Some embodiments of the invention use a mass-storage device (such as a magnetic or optical disk and its corresponding disk drive) as the permanent storage device 1625. Other embodiments use a removable storage device (such as a floppy disk or Zip® disk, and its corresponding disk drive) as the permanent storage device.

Like the permanent storage device 1625, the system memory 1615 is a read-and-write memory device. However, unlike storage device 1625, the system memory is a volatile read-and-write memory, such as a random access memory. The system memory stores some of the instructions and data that the processor needs at runtime.

Instructions and/or data needed to perform processes of some embodiments are stored in the system memory 1615, the permanent storage device 1625, the read-only memory 1620, or any combination of the three. For example, the various memory units may contain instructions for processing multimedia items in accordance with some embodiments. From these various memory units, the processor 1610 retrieves instructions to execute and data to process in order to execute the processes of some embodiments.

The bus 1605 also connects to the input and output devices 1630 and 1635. The input devices enable the user to communicate information and select commands to the computer system. The input devices 1630 include alphanumeric keyboards and cursor-controllers. The output devices 1635 display images generated by the computer system. For instance, these devices display IC design layouts. The output devices include printers and display devices, such as cathode ray tubes (CRT) or liquid crystal displays (LCD).

Finally, as shown in FIG. 16, bus 1605 also couples computer 1600 to a network 1665 through a network adapter (not shown). In this manner, the computer can be a part of a network of computers (such as a local area network ("LAN"), a wide area network ("WAN"), or an Intranet) or a network of networks (such as the Internet). Any or all of the components of computer system 1600 may be used in conjunction with the invention. However, one of ordinary skill in the art will appreciate that any other system configuration may also be used in conjunction with the invention.

While the invention has been described with reference to numerous specific details, one of ordinary skill in the art will recognize that the invention can be embodied in other specific forms without departing from the spirit of the invention. In other places, various changes may be made, and equivalents may be substituted for elements described without departing from the true scope of the present invention. For instance, the invention was described for video editing embodiments. However a person of ordinary skill in the art can apply the same techniques to still images. For example, in the case multiple images are used to perform distortion minimization, the images may not be from a video sequence but captured by a single shot (still) camera. Thus, one of ordinary skill in the art would understand that the invention is not limited by the foregoing illustrative details, but rather is to be defined by the appended claims.

What is claimed is:

1. A non-transitory computer readable medium storing a computer program that when executed by at least one processor implements a graphical user interface (GUI) for removing distortion from an image, the GUI comprising:
   a display area for displaying the image; and
   a distortion removal tool for (i) allowing a user of the GUI to identify, in the image, a first curvilinear line representing the distortion that should appear straight by drawing, on the image, a second curvilinear line over or near the first curvilinear line, (ii) determining a set of transformations based on the identification, and (iii) applying the set of transformations to the image in order to remove the distortion from the image.

2. The non-transitory computer readable medium of claim 1, wherein the distortion removal tool includes a spline tool for drawing the second curvilinear line to identify the first curvilinear line.

3. The non-transitory computer readable medium of claim 1, wherein the display area is further for displaying a version of the image with the distortion removed and the second curvilinear line straightened.

4. The non-transitory computer readable medium of claim 1, wherein the distortion removal tool allows the user to identify the first curvilinear line by specifying a plurality of points on the image.

5. The non-transitory computer readable medium of claim 4, wherein the distortion removal tool allows the user to specify the plurality of points by adding, deleting, or moving a set of points.

6. The non-transitory computer readable medium of claim 1, wherein the distortion removal tool (i) allows the user to identify at least one other curvilinear line that represents the distortion, and (ii) determines the set of transformations based on the identification of the curvilinear lines.

7. The non-transitory computer readable medium of claim 1, wherein the first curvilinear line represents a distortion caused by a lens of a camera.

8. A non-transitory computer readable medium storing a computer program that when executed by at least one processor implements a graphical user interface (GUI) for removing distortion from an image, the GUI comprising:
   a display area for displaying the image; and
   a distortion removal tool for (i) allowing a user of the GUI to identify, in the image, a curvilinear line representing the distortion that should appear straight, (ii) determining a set of transformations based on the identification, (iii) applying the set of transformations to the image in order to remove the distortion from the image, and (iv) distorting a set of graphical objects added to an undistorted version of the image.

9. The non-transitory computer readable medium of claim 8, wherein the distortion removal tool distorts the set of graphical objects by applying an inverse of at least one transformation in the set of transformations.

10. A method of removing distortion from an image, the method comprising:
    displaying the image having the distortion;
    identifying, in the image, a first curvilinear line representing the distortion that should appear straight by drawing, on the image, a second curvilinear line over or near the first curvilinear line;
    determining a set of transformations based on the identification; and
    applying the set of transformations to the image in order to remove the distortion from the image.

11. The method of claim 10, wherein drawing the second curvilinear line comprises specifying a plurality of points by adding, deleting, or moving a set of points on the image.

12. The method of claim 10, wherein drawing the second curvilinear line comprises using a spline tool to draw the second curvilinear line over or near the first curvilinear line.

13. A method of removing distortion from an image, the method comprising:
    displaying the image having the distortion;
    identifying, in the image, a curvilinear line representing the distortion that should appear straight;
    determining a set of transformations based on the identification;
    applying the set of transformations to the image in order to remove the distortion from the image;
    adding a set of graphical objects to an undistorted version of said image; and
    distorting the set of graphical objects added to the undistorted version of said image.

14. The method of claim 13, wherein distorting the set of graphical objects comprises applying an inverse of at least one transformation in the set of transformations.

15. A non-transitory computer readable medium storing a computer program for execution by at least one processor, said computer program comprising sets of instructions for:
    receiving identification of a distortion in a first image;
    identifying a transformation that represents the distortion;
    adding a set of graphical objects to at least a second image; and
    distorting, based on the transformation, the set of graphical objects added to the second image in accord with the distortion in the first image.

16. The non-transitory computer readable medium of claim 15, wherein the second image is an undistorted version of the first image.

17. The non-transitory computer readable medium of claim 15, wherein the computer program further comprises a set of instructions for adding the distorted set of graphical objects to the first image.

18. The non-transitory computer readable medium of claim 15, wherein the set of instructions for receiving identification of the distortion comprises a set of instructions for receiving a set of inputs using a spline tool to draw on the first image.

19. The non-transitory computer readable medium of claim 15, wherein the distortion is a lens distortion caused with a camera lens.

20. A non-transitory computer readable medium storing a computer program that when executed by at least one processor removes distortion from an image, the computer program comprising sets of instructions for:
displaying the image having the distortion;
identifying, in the image, a curvilinear line representing the distortion that should appear straight;
determining a set of transformations based on the identification; applying the set of transformations to the image in order to remove the distortion from the image;
adding a set of graphical objects to an undistorted version of said image; and
distorting the set of graphical objects added to the undistorted version of the image.

21. The non-transitory computer readable medium of claim 20, wherein the set of instructions for distorting the set of graphical objects comprises a set of instructions for applying an inverse of at least one transformation in the set of transformations.

22. The non-transitory computer readable medium of claim 20, wherein the distortion of the image is a lens distortion caused with a camera lens.

23. A non-transitory computer readable medium storing a computer program that when executed by at least one processor removes distortion from an image, the computer program comprising sets of instructions for:
displaying the image having the distortion;
identifying, in the image, a first curvilinear line representing the distortion that should appear straight by drawing, on the image, a second curvilinear line over or near the first curvilinear line;
determining a set of transformations based on the identification; and
applying the set of transformations to the image in order to remove the distortion from the image.

24. The non-transitory computer readable medium of claim 23, wherein the set of instructions for drawing the second curvilinear line comprises a set of instructions for using a distortion removal tool that includes a spline tool to draw the second curvilinear line over or near the first curvilinear line.

25. The non-transitory computer readable medium of claim 23, wherein the set of instructions for drawing the second curvilinear line comprises a set of instructions for specifying a plurality of points by adding, deleting, or moving a set of points on the image.

26. A method of distorting objects added to an image, the method comprising:
receiving identification of a distortion in a first image;
identifying a transformation that represents the distortion;
adding a set of graphical objects to at least a second image; and
distorting, based on the transformation, the set of graphical objects added to the second image in accord with the distortion in the first image.

27. The method of claim 26, wherein distorting the set of graphical objects comprises applying an inverse of the transformation to the set of graphical objects.

28. The method of claim 26, wherein the second image is an undistorted version of the first image, the method further comprising adding the distorted set of graphical objects to the first image.

29. The method of claim 26, wherein the set of graphical objects comprises at least one of a text object, an image object, and an icon object.

* * * * *